United States Patent [19]

Ballerstein

[11] Patent Number: 5,062,732
[45] Date of Patent: * Nov. 5, 1991

[54] TUBULAR WELDED RAILING SYSTEM

[75] Inventor: John E. Ballerstein, Fredericksburg, Va.

[73] Assignee: Standard Steel Rail Technology, Harrison, N.Y.

[*] Notice: The portion of the term of this patent subsequent to Aug. 28, 2007 has been disclaimed.

[21] Appl. No.: 563,268

[22] Filed: Aug. 6, 1990

Related U.S. Application Data

[63] Continuation-in-part of Ser. No. 341,937, Apr. 21, 1989, Pat. No. 4,952,092.

[51] Int. Cl.$^5$ ............................................. F16B 7/08
[52] U.S. Cl. ................................... 403/174; 403/178; 403/246; 403/205; 256/65
[58] Field of Search ............... 403/245, 246, 205, 174, 403/178, 260, 277, 190–193, 197, 200, 292, 290, 297; 285/189, 158; 256/59, 69, 65

[56] References Cited

U.S. PATENT DOCUMENTS

| | | | |
|---|---|---|---|
| 2,284,624 | 6/1942 | Schwinn | 403/245 |
| 3,594,025 | 7/1971 | Wagner | 285/189 X |
| 4,952,092 | 8/1990 | Ballerstein | 403/174 |

Primary Examiner—Andrew V. Kundrat
Attorney, Agent, or Firm—Eliot S. Gerber

[57] ABSTRACT

A railing system is composed of vertically aligned metal tubes and cross-members which are metal tube rails. The posts are formed with round protruding bosses whose outer diameter (OD) is the same as the outer diameter of the posts. The rails also have the same outer diameter. The bosses and rail ends may be brought into roundness, so that they match in a smooth circumferential seam, by round plugs forced into the bosses and rail ends. The post-rail joints are then welded in a circumferential weld.

5 Claims, 1 Drawing Sheet

5,062,732

TUBULAR WELDED RAILING SYSTEM

DESCRIPTION OF THE RELATED ART

This application is a continuation-in-part application based in part on patent application Ser. No. 07/341,937, entitled "Tubular Railing System", filed Apr. 21, 1989, now U.S. Pat. No. 4,952,092 issued Aug. 28, 1990.

BACKGROUND OF THE INVENTION

Field of the invention

The present invention relates to hand railings constructed of metal tubes and more particularly to a railing system using prefabricated components.

At the present time it is known to form hand railings from metal tubes or pipes in a number of ways. The railing generally consists of a tandem series of evenly spaced posts which are vertically aligned. Each pair of posts is joined by one, two or more generally horizontally aligned rails. When the railing is used on the side of a stair, the generally horizontal rails are at an angle, for example, 35 degrees, from the true horizontal.

In one metal tube pipe system the ends of the horizontal rail tubes are externally threaded and screwed into a pip-threaded T on the vertical post. That system presents an inexpensive and unfinished pipe rail system which is unacceptable in quality building construction.

In an alternative metal pipe system the pipes are joined by external slip-on fittings available from Hollaender Manufacturing Company, Cincinnati, Ohio. That system also presents a railing having a crude appearance which is unacceptable in many locations.

In another system the tubular posts are formed with holes each having a round opening, with the holes being smaller in diameter than the post. For example, a 2½-inch post (outer diameter "OD") has 2-inch hole (OD). Each horizontal rail ("side rail") is aligned with a hole and the end of the side rail is formed with top and bottom V-shaped cuts. The V of the horizontal (side) rail is placed next to the hole of the post. The post and rail are then welded together. The weld is then ground to present a smooth and finished joint. That system provides a strong railing which is architecturally acceptable due to its even finish. However, that system is relatively expensive since it involves considerable on-site skilled welding and grinding. In addition, the side rails are smaller in diameter than the posts.

In still another system the tubes are pre-finished and joined by a mechanical internal split-sleeve. The joints are adhered by epoxy adhesive and also by bolts. This "Connectorail" system (TM Julius Blum & Co., Carlstadt, N.J.), in one aspect, is shown in U.S. Pat. No. 4,150,907.

OBJECTIVES AND FEATURES OF THE INVENTION

It is an objective of the present invention to provide a metal tube railing system which may be prefabricated in a factory and rapidly and accurately assembled on-site.

It is a further objective of the present invention to provide such a metal tube railing system in which the posts and the side rails (generally horizontal rails) are of the same outside diameter to present an architecturally acceptable appearance.

It is a further objective of the present invention to provide such a metal tube railing system in which the joint between the posts and side rails will be smooth and even and, after painting, would be practically invisible.

It is a further objective of the present invention to provide such a metal tube railing system in which the post-side joints are welded and which would provide a joint permitting rapid and accurate welding and rapid grinding.

SUMMARY OF THE INVENTION

In accordance with the present invention, there is provided a railing system using tubular metal posts and rails in which the post and rails have the same outside diameter. Each post has at least one protruding boss which is annular and is joined to the flat annular end of a rail. Round plugs, preferably machined to be round, are forced into the bosses and rail ends, causing them to be round so that the bosses and rail ends will meet in smooth and almost perfectly round joints. Such joints may be welded using simply made circumferential welds and the welds rapidly ground down to form smooth joints.

BRIEF DESCRIPTION OF THE DRAWINGS

Other objectives and features of the present invention will be apparent from the following detailed description taken in conjunction with the accompanying drawings.

In the drawings.

DETAILED DESCRIPTION OF THE PREFERRED EMBODIMENTS

Figure 1:
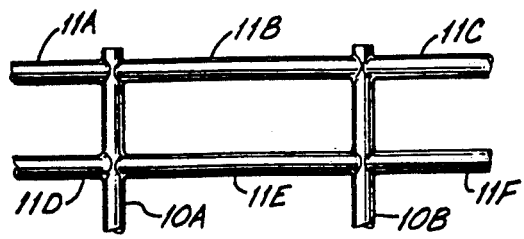
FIG. 1 is a side plan view of the railing system of the present invention.

As shown in FIG. 1, the rail system of the present invention includes a tandem series of vertically aligned posts 10A, 10B. Side rails 11A–11F extend between the posts and are fastened to the posts. In FIG. 1 two parallel rails are shown. Some rail systems utilize only one rail and some use three or more.

Generally the posts 10A, 10B are waist-high, for example, 38" or 50" in height. The rails 11B, 11C are separated by a convenient spacing, for example, one-half the height of the posts.

The posts and rails are formed of tubular metal, preferably aluminum, brass or steel. The posts and the rails have the same outer diameter. For example, the posts and rails are ½, ¾, 1¼, 1½, 2, 2¼, 2⅜ or 2½ inch outer diameter.

Figure 3:
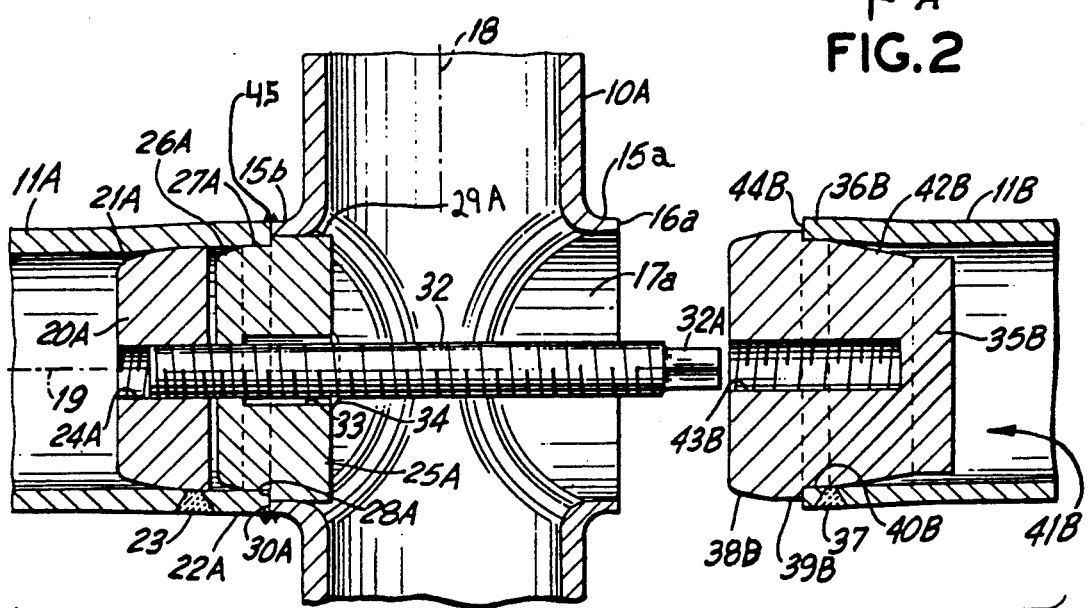
FIG. 3 is a cross-sectional view taken along line A—A of FIG. 2 and also showing a cross-sectional view of the end of a rail.
Figure 4:
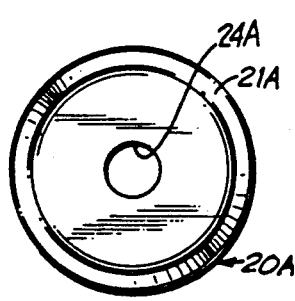
FIGS. 4-6 are front plan views of the three plugs of the present invention.
Figure 5:
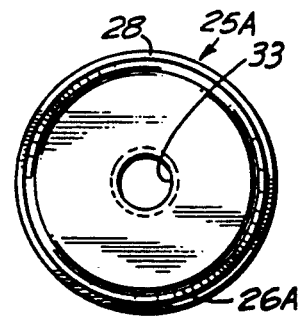
Figure 6:
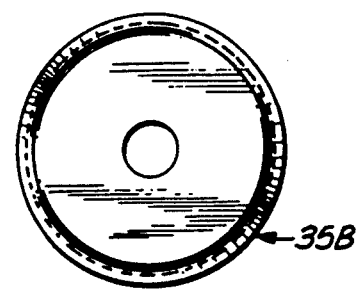

As shown in FIG. 3, the post 10A is formed with opposite protruding bosses 15a, 15b. Each rail end is connected to a post boss. Each boss 15a, 15b has the same shape and size as the other post bosses. A post which is an intermediate post having two rails would have four post bosses and an end post, in the two-rail system, would have two bosses.

Figure 2:
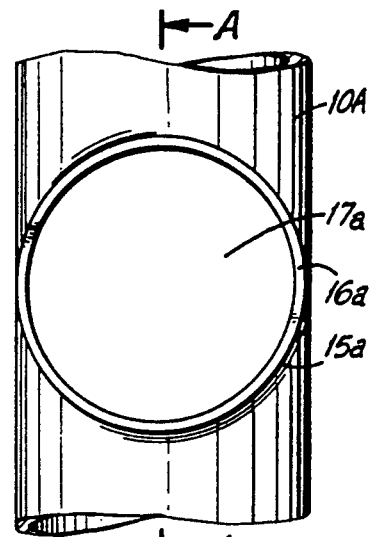
FIG. 2 is an enlarged front plan view of a portion of a post.

The boss 15a has an annular flat end lip 16a forming a round opening 17a. The flatness of the lip (boss edge) is perpendicular to the axis of the boss. The boss 15a shown in FIGS. 2 and 3 is for a rail system in which the side rails are perpendicular to the posts, i.e., the imaginary axis 18 of the post is at a 90° angle to the imaginary axis 19 of the boss. Alternatively, the bosses may be arranged at other suitable angles, for example, angles of 29°, 32°, 35° or 38° when the rail system is used on a stairway.

The actual outer diameter of the ends of the rail steel tubes is different from their commercially expressed size. For example, in one embodiment, the rail tube is 2.375 inches OD (2⅜) but is expanded, at its ends, as explained below, to have an outer diameter of 2.395 inches. Consequently, the boss is designed to exactly match the expanded rail end. In this example, the boss 15a also has an outer diameter of 2.395 inches, to match an expanded 2⅜-inch tube.

As shown in FIG. 3, the tubular rail 11A is expanded at its end portion 22A by the round plug 20A. The round plug 20A, and the other round plugs, are preferably machined of steel to be as perfectly round as commercially feasible, for example, round to within 0.001-inch of a perfect circle. The plug 20A has, as an integral portion, an inclined annular shoulder 21A, preferably a 10° incline, so that the plug may be forced into the open end of rail 11A, for example, by a hydraulic ram, thereby expanding the rail end portion 22A by +0.20-inch. For example, with 2.375 OD, the tube 11A original inner diameter is 2.067 and it is expanded to 2.087 inches by plug 20A. The plug 20A is welded by weld spot 23, to the tube end portion 22A.

The plug 20A has a central bore 24A which is screw-threaded internally.

A second plug 25A is used in the boss 15a to expand it and make it round. The second plug 25A has, as integral portions thereof, an annular inclined shoulder portion 26A; a flat annular shoulder portion 27A parallel to axis 19; a flat annular flange portion 28A vertical to axis 19 and a larger outer diameter portion 29A. A shoulder portion 27A fits within the end portion 22A of the tube 11A and a flat annular edge 30A of the rail end partly abuts the flange portion 28A and also partly abuts the flat end lip 16A of the boss.

A screw-threaded bolt 32 is screwed into bore 33 of plug 25A and welded to the plug 25A by weld 34. The bolt 32 protrudes from plug 25A and is screwed into the plug 20A. The bolt 32 has a square head portion 32A which permits the bolt 32, along with its plug 25a, to be turned by a tool. Such turning of the bolt 32 draws the flat edge of rail 11A tightly and flush against the flat edge of boss 15b.

The rail 11B has a round plug 35B which expands the end portion 36B of the rail and makes it more round. The plug 35B is fixed to the rail end portion 36B by weld spot 37. The rail end portion 36B, in a 2⅜ inch tube, has an initial inner diameter of 2.067 and is expanded to a final inner diameter of 2.087 by the plug 35B. Its original outer diameter of 2.375 is expanded by plug 35B to a final outer diameter of 2.415 inches, which matches the outer diameter of 2.415 inches of the boss 15b.

The plug 35B has, as integral portions thereof, an inclined annular shoulder portion 38B having preferably a 10° taper, a larger straight annular portion 39B which fits within the boss 15a, a smaller straight annular portion 40b which fits within the rail end portion 36B, and a smaller annular tapered portion 42B having a taper of 10°. The plug 35B is forced in the end portion 41B of the rail 11B, for example, by a hydraulic ram.

To assemble rail 11B to the post 10A one fits the screw-threaded bore 43B of the plug 35B on the bolt 32 and rotates the rail 11B until the lip 44B of the rail is flush against the lip 16a of the boss 15a.

The match of the rail ends and bosses is sufficiently flush so that it is almost invisible to the naked eye.

The rail-post joints are then welded by weld 45 and the weld line ground smooth. The weld line 45 is circular and ring-like. Since the post-rail joint is a ring-like weld it is relatively simple to weld and to then grind the weld line. When painted, the rail-post joint is likely to be invisible.

The conventional tubular metal rail system uses smaller outer diameter rails than the outer diameter of the posts, for example, posts of 2⅜ inches OD and rails of 2 inches OD. In contrast, the present invention uses rails and posts of substantially the same diameter, for example, both are 2⅜ inches OD. The ends of the rails are slightly enlarged, for example, +0.020 inch, as are the bosses of the posts; but that enlargement is only about 1% of the total diameter of the tube. In that sense, of being within 1% or 2%, the ends of the rails and the bosses are substantially the same outer diameter as the posts and rails.

The rails and posts, described above, are joined by a bolt system prior to being welded. Alternatively, they may be held in a fixture, which aligns them and holds them together without bolts, and then welded together with a ring-like weld 45.

I claim:

1. A metal tube railing system comprising:
   (a) a plurality of vertically aligned metal tubular posts each post having an outer diameter and at least one circular annular boss having substantially the same outer diameter as said post and having a flat annular lip, said boss being formed from said post and being integral therewith;
   (b) a plurality of tubular metal side rails extending between said posts with each rail having opposite ends, the outer diameter of each of said side rails being the same as the outer diameter of said annular lip of said boss and both ends of each rail having a flat annular edge;
   (c) a circular ring like weld means to join said side rail edges and said boss flat annular lips to thereby form circular weld joints.

2. A railing system as in claim 1 wherein said side rails are perpendicular.

3. A railing system as in claim 1 wherein said side rails are at an angle of about 35° to said posts.

4. A railing system as in claim 1 wherein said joining means are in a circular ring-like weld.

5. A railing system as in claim 1 and further including a plurality of circular metal plug means to force the tubular rail ends and bosses into being more perfectly round than without said plug means with each of said plug means being inserted into each boss and side rail end.

* * * * *